(12) United States Patent
Gala

(10) Patent No.: US 8,231,778 B2
(45) Date of Patent: Jul. 31, 2012

(54) HYDROCRACKING PROCESSES YIELDING A HYDROISOMERIZED PRODUCT FOR LUBE BASE STOCKS

(75) Inventor: Hemant B. Gala, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 762 days.

(21) Appl. No.: 12/346,928

(22) Filed: Dec. 31, 2008

(65) Prior Publication Data
US 2010/0163454 A1 Jul. 1, 2010

(51) Int. Cl.
*C10G 47/12* (2006.01)
*C10G 47/20* (2006.01)
*C10M 177/00* (2006.01)

(52) U.S. Cl. ......... 208/109; 208/18; 208/95; 208/111.3; 208/111.35

(58) Field of Classification Search ............ 208/18, 208/49, 58, 95, 108, 111.3, 111.35, 143, 208/144
See application file for complete search history.

(56) References Cited

U.S. PATENT DOCUMENTS

| | | | |
|---|---|---|---|
| 3,755,145 A | 8/1973 | Orkin | 208/111 |
| 3,790,472 A | 2/1974 | White | 208/111 |
| 3,912,620 A | 10/1975 | Gallagher | 208/210 |
| 4,313,817 A | 2/1982 | Mayer et al. | 208/89 |
| 4,395,327 A | 7/1983 | Pelrine | 208/216 |
| 4,486,296 A | 12/1984 | Oleck et al. | |
| 4,983,273 A * | 1/1991 | Kennedy et al. | 208/89 |
| 5,110,445 A | 5/1992 | Chen et al. | |
| 5,171,422 A | 12/1992 | Kirker et al. | 208/111 |
| 5,264,116 A * | 11/1993 | Apelian et al. | 208/111.1 |
| 5,444,033 A | 8/1995 | Usui et al. | 502/314 |
| 5,543,035 A | 8/1996 | Ziemer | 208/111 |
| 6,051,127 A | 4/2000 | Moureaux | 208/58 |

(Continued)

FOREIGN PATENT DOCUMENTS

| | | | |
|---|---|---|---|
| CA | 986051 | 3/1976 | 196/54 |
| CN | 1210883 | 3/1999 | |
| DE | 122994 | 11/1976 | |

(Continued)

OTHER PUBLICATIONS

Khashagul'gova, N.S. et al., "Improving the hydrogenating activity of industrial selective hydrocracking catalysts," Russian Scientific Research Institute of Petroleum Industry, Angarsknefteorgsintez Industrial Group; Khimiya I Tekhnologiya Topliv I Masel N. 11 9-12 (1993) ISSN: 0023-1169. [Abstract Only].

*Primary Examiner* — Walter D Griffin
*Assistant Examiner* — Renee E Robinson
(74) *Attorney, Agent, or Firm* — James C Paschall

(57) ABSTRACT

Methods are disclosed for hydrocracking processes that convert a significant portion of a heavy hydrocarbon feedstock such as vacuum gas oil (VGO) to lower molecular weight, lower boiling hydrocarbons. In addition to molecular weight reduction, the processes also substantially reduce the pour point of a recovered higher boiling fraction or unconverted oil, all or a portion of which may be used as a lube base stock, optionally after one or more further treatment steps such as hydrofinishing. The ability to reduce the pour point, through hydroisomerization, of the higher boiling fraction greatly improves the quality of this fraction, or unconverted oil, for use in lube base stock preparation. Advantageously, separate, conventional hydroisomerization and/or dewaxing steps, often requiring a noble metal catalyst, may be avoided in particular embodiments disclosed herein.

20 Claims, 1 Drawing Sheet

U.S. PATENT DOCUMENTS

| | | | |
|---|---|---|---|
| 6,096,191 A | 8/2000 | Kalnes | |
| 6,517,704 B1 | 2/2003 | Carroll et al. | |
| 6,517,705 B1 | 2/2003 | Kalnes et al. | |
| 6,569,313 B1 * | 5/2003 | Carroll et al. | 208/49 |
| 7,084,087 B2 | 8/2006 | Shan et al. | |
| 7,169,291 B1 * | 1/2007 | Wang | 208/109 |
| 2002/0038777 A1 | 4/2002 | Cody et al. | 208/87 |

FOREIGN PATENT DOCUMENTS

| | | |
|---|---|---|
| DE | 223163 | 6/1985 |
| DE | 261604 | 11/1988 |
| KR | 20070004530 A | 9/2007 |
| RU | 225433 | 3/2004 |
| WO | 2005001006 A2 | 1/2005 |

* cited by examiner

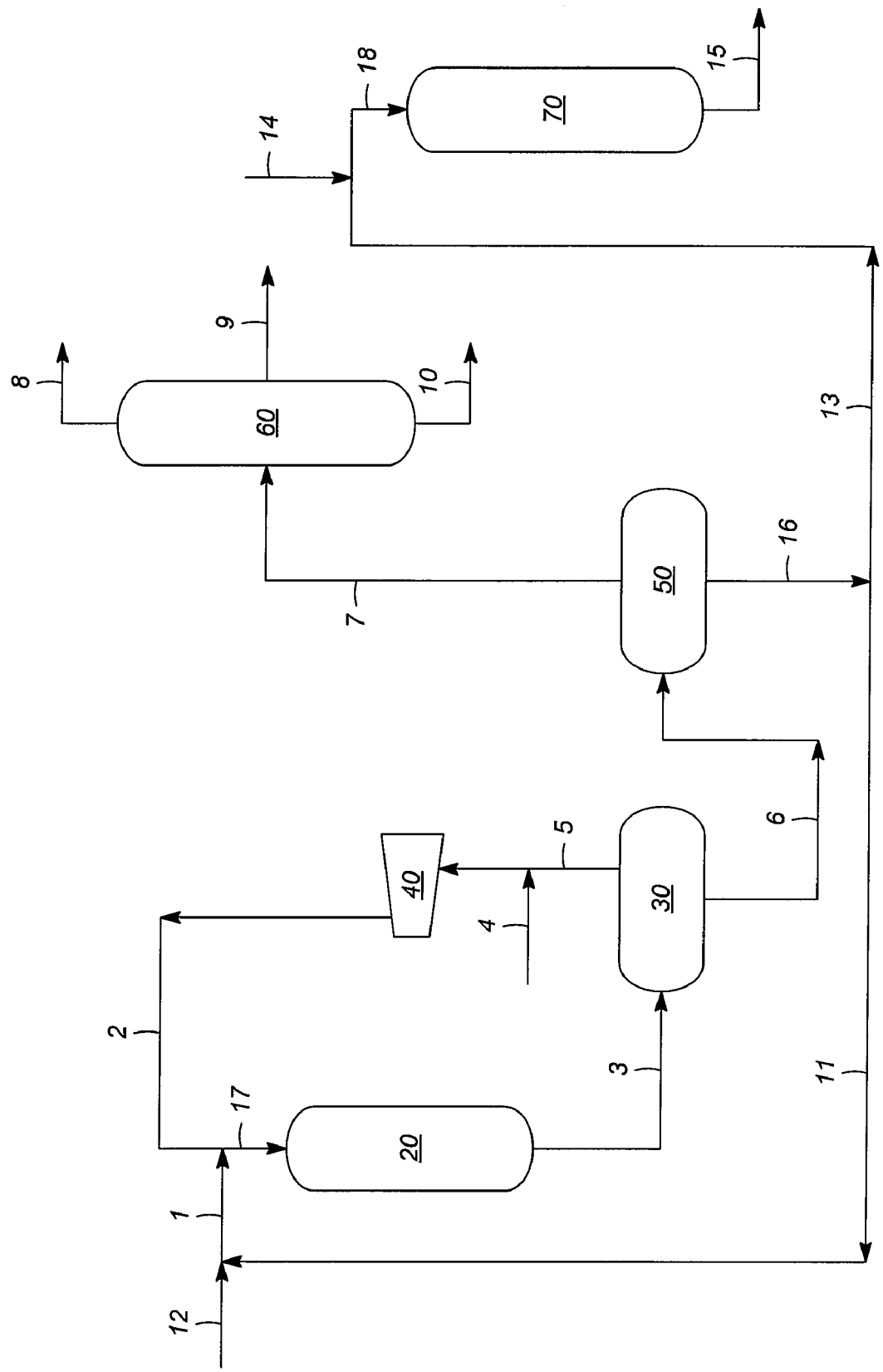

HYDROCRACKING PROCESSES YIELDING A HYDROISOMERIZED PRODUCT FOR LUBE BASE STOCKS

FIELD OF THE INVENTION

The present invention relates to methods for converting heavy hydrocarbon feedstocks (e.g., vacuum gas oil) to lower-boiling hydrocarbons (e.g., diesel boiling range and lighter) through hydrocracking while also providing a higher boiling fraction of the hydrocracker effluent that is hydroisomerized to reduce its pour point, rendering it more valuable as a lube base stock.

DESCRIPTION OF RELATED ART

Petroleum refiners often produce desirable products such as lube base stock by hydrocracking a hydrocarbon feedstock derived from crude oil, for example. Feedstocks most often subjected to hydrocracking for lube base stock production are gas oils and heavy gas oils recovered from crude oil by distillation. A typical gas oil comprises a substantial portion of hydrocarbon components, usually about 50% or more by weight, boiling above about 382° C. (720° F.). An exemplary boiling point range for a vacuum gas oil is from about 316° C. (600° F.) to about 566° C. (1050° F.).

Hydrocracking is generally accomplished by contacting, in a hydrocracking reactor or reaction zone, the gas oil or other feedstock to be treated with a suitable hydrocracking catalyst under conditions of elevated temperature and pressure. Hydrocracking reactions reduce the overall molecular weight of the heavy hydrocarbon feedstock to yield upgraded (i.e., higher value) products including blending components for transportation fuels such as diesel and gasoline. These upgraded products that are converted in the hydrocracking reaction zone are typically separated from the total hydrocracker effluent as lower boiling fractions, using one or more separation and/or distillation operations. A remaining, higher boiling fraction, often referred to as unconverted oil, is recycled to the hydrocracking reactor or reaction zone to improve the overall hydrocracking conversion.

While this recycled material contains predominantly higher molecular weight hydrocarbons, the "unconverted" oil is normally still considered to have improved quality compared to the fresh heavy hydrocarbon feedstock, due to other reactions in the hydrocracking zone. In particular, heteroatomic contaminants and particularly sulfur and nitrogen compounds are removed, aromatic compounds are hydrogenated to their corresponding saturated cyclic compounds, and viscosity is reduced. As a result, the unconverted oil is stabilized and generally has properties that are favorable for lubricant base oils (e.g., used in automotive engines). Generally, the unconverted oil from hydrocracking is subjected to a second catalytic conversion step such as hydroisomerization or dewaxing in the presence of a suitable catalyst, often containing a noble metal such as platinum or palladium. Hydroisomerization converts normal paraffins to isoparaffins, while dewaxing reduces paraffin molecular weight, with both of these catalytic processes beneficially reducing the pour point of the unconverted oil. Following such reactions to lower the pour point, a hydrofinishing step may then be used to further hydrogenate remaining unsaturated hydrocarbons and remove sulfur and nitrogen, thereby improving the lube base stock in terms of various desired properties such as thermal stability and oxidation resistance.

A representative lube base stock preparation method utilizing hydrocracking, is described, for example, in U.S. Pat. No. 6,432,297, in which the hydrocracker effluent is subjected to hot hydrogen stripping, followed by hydroisomerization and hydrofinishing of a fraction exiting the stripper bottoms. While a wide variety of process flow schemes, operating conditions, and catalysts have been used in commercial lube base stock production, there remains a need for new methods, including those utilizing hydrocracking, which can reduce costs and improve operating efficiencies.

SUMMARY OF THE INVENTION

Embodiments of the invention relate to the discovery of hydrocracking processes that (i) convert a significant portion of a heavy hydrocarbon feedstock such as vacuum gas oil (VGO) to lower molecular weight, lower boiling hydrocarbons and also (ii) substantially reduce the pour point of a higher boiling fraction, a portion of which may be recycled to the hydrocracking reactor or reaction zone and another portion of which may be used as a lube base stock, optionally after one or more further treatment steps such as hydrofinishing. The ability to provide both substantial upgrading through molecular weight reduction and hydroisomerization (or pour point reduction) of a higher boiling fraction resides in a combination of the hydrocracking catalyst and operating conditions used, as described in greater detail below.

Suitable lube base stocks prepared by methods comprising hydrocracking as described herein preferably meet the specifications for Group II and Group III lubricant base oils, in terms of saturate hydrocarbon content, sulfur content, and viscosity index, as designated by the American Petroleum Institute (API). According to representative embodiments of the invention, the unconverted oil recovered as a higher boiling fraction (e.g., in terms of its initial boiling point) relative to the total hydrocracker effluent, may be used as a lube base stock, optionally following hydrofinishing, but without the need for a catalytic hydroisomerization or a catalytic dewaxing step. The ability to remove this process step allows for lube base stocks to be produced with hydrocracking at a significantly reduced cost relative to known methods requiring, for example, the reactor, catalyst, and associated equipment for a separate hydroisomerization step. In particular, the noble metal (e.g., platinum or palladium) catalysts conventionally needed for hydroisomerization to sufficiently reduce the pour point of the unconverted oil represent a substantial expense that may be saved in lube base stock production methods that do not incorporate this step.

These and other embodiments relating to the present invention are apparent from the following Detailed Description.

BRIEF DESCRIPTION OF THE DRAWING

FIG. 1 depicts a representative process involving hydrocracking followed by hydrofinishing in successive reactor zones, for the production of lube base stock

DETAILED DESCRIPTION

Embodiments of the invention relate to hydrocracking processes for the preparation of lube base stock. Representative methods comprise hydrocracking a heavy hydrocarbon feedstock to obtain a hydrocracker effluent, which is generally the total product exiting the hydrocracking reactor or reaction zone. A heavy hydrocarbon feedstock is generally a distillable petroleum derived fraction having a boiling point range which is above that of diesel fuel. A representative heavy hydrocarbon feedstock to the hydrocracker is a mixture of a recycled portion of unconverted oil, recovered from the hydrocracker effluent as a higher boiling fraction and recycled to the hydrocracking reactor, together with any fresh feed component that can benefit from hydrocracking to decrease its overall molecular weight, and/or remove organic sulfur and nitrogen compounds and metals.

Suitable fresh feed components of the heavy hydrocarbon feedstock include gas oils, such as vacuum gas oil (VGO), that boil in representative ranges, for example, from about 288° C. (550° F.) to about 593° C. (1100° F.), and often from about 343° C. (650° F.) to about 566° C. (1050° F.). In addition to, or other than, VGO, particular fresh feed components therefore include a wide variety of straight run and converted hydrocarbon fractions obtained in refinery operations (i.e., derived from crude oil), such as atmospheric gas oils, vacuum and deasphalted vacuum resids (e.g., boiling above 566° C. (1050° F.)), atmospheric resids (e.g., boiling above about 343° C. (650° F.)), coker distillates, straight run distillates, whole or topped petroleum crude oils including heavy crude oils, pyrolysis-derived oils, high boiling synthetic oils, cycle oils and catalytic cracker (e.g., fluid catalytic cracking or FCC) distillates. Fresh feed components of the heavy hydrocarbon feedstock may also include mineral oils and synthetic oils (e.g., tars, bitumen, coal oils, shale oil, tar sand products, etc.) and fractions thereof.

Any of the above fresh feed components or combinations of components may be hydrotreated prior to being introduced into the hydrocracking reactor or reaction zone, to remove, for example, sulfur and/or nitrogen compounds such that the fresh feed component will have total sulfur and nitrogen levels below, for example, 500 ppm by weight and 100 ppm by weight, respectively. Hydrotreating may be performed in a separate hydrotreating reactor or in the same reactor as used for hydrocracking by incorporating, for example, a bed of hydrotreating catalyst upstream of the hydrocracking catalyst.

A representative heavy hydrocarbon feedstock is a combination of VGO or a predominantly VGO (e.g., generally at least about 50%, and often at least about 75%, by weight VGO) fresh feed component and a recycled portion of the hydrocracker effluent. Regardless of the particular components that make up the heavy hydrocarbon feedstock, this stream generally comprises at least 50%, and often at least 75%, by weight of hydrocarbons boiling at temperatures above the initial boiling point of the desired lube base stock. The initial boiling point of the heavy hydrocarbon feedstock is generally at least about 288° C. (550° F.) and often at least about 343° C. (650° F.). Illustrative heavy hydrocarbon feedstocks therefore normally contain hydrocarbons boiling above 288° C. (550° F.), and generally comprise at least about 25%, typically at least 35%, and often at least about 50%, by weight of hydrocarbons boiling in a range from 316° C. (600° F.) to about 538° C. (1000° F.).

The heavy hydrocarbon feedstock will generally contain organic nitrogen compounds and organic sulfur compounds. The total sulfur content, substantially present in the form of organic sulfur compounds such as alkylbenzothiophenes, will generally range from about 0.1% to about 7%, normally from about 0.2% to about 5%, and often from about 0.5% to about 3%, by weight of total sulfur. The heavy hydrocarbon feedstock will also generally contain from about 100 ppm to about 2%, and normally from about 100 ppm to about 2000 ppm, by weight of total nitrogen, substantially present in the form of organic nitrogen compounds such as non-basic aromatic compounds including cabazoles. The content of metallic (e.g., nickel, iron and vanadium) contaminants of the heavy hydrocarbon feedstock, will generally be from about 0.1 ppm to about 20 ppm by weight and the Conradson carbon residue will generally be from about 0.1% to about 5% by weight. The API gravity will generally range from about −5° to about 35°. In addition, the heavy hydrocarbon feedstock will normally contain asphaltenes, which are polycondensed aromatic compounds containing oxygen, nitrogen, and sulfur heteroatoms, as well as heavy metals such as nickel and vanadium.

As discussed above, it has now been surprisingly determined that hydrocracking may be carried out under conditions and in the presence of catalysts that not only significantly reduce the molecular weight of the hydrocracker effluent stream, but also hydroisomerize a higher boiling fraction of this effluent, a portion of which is normally recycled to the hydrocracking reactor and another portion of which is used, optionally after further steps that may include hydrofinishing, as a lube base stock. In particular, in terms of conversion of the heavy hydrocarbon feedstock to one or more lower molecular weight products (e.g., naphtha and diesel fuel) that may be recovered from the hydrocracker effluent in separate product streams using one or more single stage (flash) or multiple stage (distillation) separation operations in the downstream product recovery section, generally at least about 40% (e.g., from about 50% to about 90%), typically at least 55% (e.g., from about 60% to about 85%), and often at least 70% (e.g., from about 70% to about 80%), by volume of the hydrocarbons in the hydrocracker effluent, relative to the heavy hydrocarbon feedstock volume, boil at a temperature of less than 382° C. (720° F.) (cutoff temperature or cut point) and are therefore converted to diesel boiling range hydrocarbons or lighter. Therefore, the "once-through gross liquid volume conversion" (based on volumetric flow rates of the heavy hydrocarbon feedstock and a recovered, lower boiling fraction, with a distillation end point below this cutoff temperature) generally has the values or is within the ranges indicated above.

Those having skill in the art will appreciate that the hydrocracking conversion levels, for any given heavy hydrocarbon feedstock and catalyst system, can be varied by adjusting process variables, and particularly the average catalyst bed temperature and/or the reactor residence time (or liquid hourly space velocity). In terms of the extent of hydroisomerization of a recovered, higher boiling fraction (with an initial boiling point above this cutoff temperature) of the hydrocracker effluent, the pour point of this unconverted oil (at any of the representative conversion levels indicated above) is generally at most about 18° C. (65° F.), typically at most about 10° C. (50° F.), and often at most about −1° C. (30° F.).

Relative to conventional hydrocracking processes, the reduction in pour point of the unconverted oil, separated from the hydrocracker effluent as a higher boiling fraction, results from the hydrocracking catalyst and hydrocracking conditions used, which simultaneously promote significant hydroisomerization (i.e., conversion of straight-chain paraffins to branched paraffins) in the hydrocracking reactor or reaction zone, along with molecular weight reduction of the heavy hydrocarbon feedstock, as discussed above. Hydrocracking of the heavy hydrocarbon feedstock as described above is generally carried out in the presence of a hydrocracking catalyst and hydrogen.

Representative hydrocracking conditions include an average hydrocracking catalyst bed temperature from about 260° C. (500° F.) to about 593° C. (1100° F.), often from about 316° C. (600° F.) to about 454° C. (850° F.); a hydrogen partial pressure from about 3.5 MPa (500 psig) to about 21 MPa (3000 psig), often from about 8.3 MPa (1200 psig) to about 17.2 MPa (2500 psig); an LHSV from about 0.1 $hr^{-1}$ to about 30 $hr^{-1}$, often from about 0.5 $hr^{-1}$ to about 3 $hr^{-1}$; and a hydrogen circulation rate from about 2000 standard cubic feet per barrel (337 normal m³/m³) to about 25,000 standard cubic feet per barrel (4200 normal m³/m³), often from about 4000 standard cubic feet per barrel (692 normal m³/m³) to about 15,000 standard cubic feet per barrel (2530 normal m³/m³).

Suitable catalysts for use in the hydrocracking catalyst bed or zone to provide the hydrocracker effluent as described above include those comprising a metal selected from the group consisting of iron, nickel, cobalt, tungsten, molybdenum, vanadium, ruthenium, and mixtures thereof, deposited on a zeolite. Representative zeolites for hydrocracking catalyst supports, for which the advantageous results, as described herein, may be obtained include beta zeolite, Y zeolite and MFI zeolite. The structures of Y zeolite and MFI zeolite are described, and further references are provided, in Meier, W. M, et al., *Atlas of Zeolite Structure Types*, 4$^{th}$ Ed., Elsevier: Boston (1996).

Beta zeolite is an exemplary support material for hydrocracking catalysts used in the methods described herein. Beta zeolite is well known in the art as a component of hydrocracking catalysts, and is described, for example, in U.S. Pat. No. 3,308,069 and Re No. 28,341, which are incorporated herein with respect to their description of this material. The beta zeolite that is used in the process disclosed herein has a silica:alumina molar ratio ($SiO_2:Al2O_3$) of less than 30:1 in one embodiment, of less than 25:1 in another embodiment, of more than 9:1 and less than 30:1 in yet another embodiment, of more than 9:1 and less than 25:1 in a fourth embodiment, of more than 20:1 and less than 30:1 in a fifth embodiment, and of more than 15:1 and less than 25:1 in a sixth embodiment.

The beta zeolite is usually synthesized from a reaction mixture containing a templating agent. The use of templating agents for synthesizing beta zeolite is well known in the art. For example, U.S. Pat. No. 3,308,069 and Re No. 28,341 describe using tetraethylammonium hydroxide and U.S. Pat. No. 5,139,759, which is incorporated herein by reference, describes using the tetraethylammonium ion derived from the corresponding tetraethylammonium halide. It is believed that the choice of a particular templating agent is not critical to the success of the hydrocracking processes disclosed herein. In one embodiment the beta zeolite is calcined in air at a temperature of from about 500° C. (932° F.) to about 700° C. (1292° F.) for a time sufficient to remove the templating agent from the beta zeolite. Calcination to remove the templating agent can be done before or after the beta zeolite is combined with the support and/or the hydrogenation component. Although it is believed that the templating agent could be removed at calcination temperatures above 700° C. (1292° F.), very high calcination temperatures could significantly decrease the $SF_6$ adsorption capacity of beta zeolite. For this reason it is believed that calcination temperatures above 750° C. (1382° F.) for removing the templating agent should be avoided when preparing the beta zeolite. It is preferred that the $SF_6$ adsorption capacity of the beta zeolite is at least 28 wt-%.

Hydrothermally treating zeolites for use in hydrocracking catalysts is known. Nevertheless, steaming is a relatively blunt tool. For any given zeolite, steaming decreases the acidity of the zeolite. When the steamed zeolite is used as a hydrocracking catalyst, the apparent result is that the overall distillate yield increases but the LPG yield and catalyst activity both decrease. This apparent tradeoff between the distillate yield, on the one hand, and LPG yield and activity, on the other hand, has meant that, to achieve high activity and high LPG product yields, the zeolite should not be steamed, although this reduces distillate product yields. This apparent tradeoff between overall yields and activity must be considered and is a limit to the improvement, which appears to be obtainable by steaming the zeolite.

The hydrocracking processes disclosed herein can employ catalysts comprising relatively low amounts of a beta zeolite having a relatively low silica:alumina molar ratio and a relatively high $SF_6$ adsorption capacity. It has been found that differing performance results when such beta zeolite is incorporated in hydrocracking catalysts in this way. Not only is the activity of the hydrocracking catalyst higher than that of catalysts containing steamed beta zeolite, but unexpectedly the product yield is higher too.

The hydrocracking catalyst has a size and shape that is normally similar to those of conventional commercial catalysts. It is preferably manufactured in the form of a cylindrical extrudate having a diameter of from about 0.8-3.2 mm (1/32-1/8 in). The catalyst can however be made in any other desired form such as a sphere or pellet. The extrudate may be in forms other than a cylinder such as the form of a well-known trilobe or other shape which has advantages in terms or reduced diffusional distance or pressure drop.

The hydrocracking catalyst may contain a number of non-zeolitic materials which can beneficially affect particle strength, cost, porosity, and performance. The other catalyst components, therefore, make positive contributions to the overall catalyst even if not necessary as active cracking components. These other components are part of the catalyst support. Some traditional components of the support such as silica-alumina normally make some contribution to the cracking capability of the catalyst. In one embodiment, the catalyst of the processes disclosed herein contains a positive amount less than 15 percent beta zeolite by weight, based on the combined weight of the beta zeolite and the other support components on a volatile-free basis. A volatile-free basis refers to the weight of the beta zeolite and the support, determined after each has been heated at 500° C. (932° F.) to drive off all volatile matter. Based on the combined weight of the beta zeolite and the other support components on a volatile-free basis, the zeolite content of the catalyst used in the process disclosed herein is a positive amount less than 3 wt-% in another embodiment, less than 2 wt-% in a third embodiment, less than 1.5 wt-% in a fourth embodiment, less than 1 wt-% in a fifth embodiment, less than 0.5 wt-% in a sixth embodiment, and from 0.1 to 2 wt-% in a seventh embodiment. The remainder of the catalyst particle besides the zeolitic material may be taken up primarily by conventional hydrocracking support components such as alumina and/or silica-alumina. The presence of silica-alumina helps achieve the desired performance characteristics of the catalyst. In one embodiment the catalyst contains at least 25 wt-% alumina and at least 25 wt-% silica-alumina based on the weight of the catalyst. In another embodiment, the silica-alumina content of the catalyst is above 40 wt-% and the alumina content of the catalyst is above 35 wt-%, both based on the weight of the catalyst. However, the alumina is believed to function only as a binder and to not be an active cracking component. The catalyst support may contain over 50 wt-% silica-alumina or over 50 wt-% alumina based on the total weight of the support. Approximately equal amounts of silica-alumina and alumina are used in a representative embodiment. Other inorganic refractory materials which may be used as a support in addition to silica-alumina and alumina include for example silica, zirconia, titania, boria, and zirconia-alumina. These aforementioned support materials may be used alone or in any combination.

Besides the beta zeolite and other support components, the hydrocracking catalyst may contain a metallic hydrogenation component. The hydrogenation component is preferably provided as one or more base metals uniformly distributed in the catalyst particle. Noble metals such as platinum and palladium could be applied but best results have been obtained with a combination of two base metals. Specifically, either nickel or cobalt is paired with tungsten or molybdenum, respectively. The preferred composition of the metal hydrogenation component is both nickel and tungsten, with the amount by weight of the elemental metal of tungsten being about two to three times the amount of nickel. The amount of nickel or cobalt is preferably between about 2 and 8 weight percent of the finished catalyst. The amount of tungsten or molybdenum is preferably between about 8 and about 22 weight percent of the finished catalyst. The total amount of a base metal hydrogenation component is from about 10 to 30 weight percent.

The hydrocracking catalyst can be formulated using industry standard techniques. This can, with great generalization, be summarized as admixing the beta zeolite with the other inorganic oxide components and a liquid such as water or a mild acid to form an extrudable dough followed by extrusion through a multihole die plate. The extrudate is collected and preferably calcined at high temperature to harden the extrudate. The extruded particles are then screened for size and the hydrogenation components are added as by dip impregnation or the well known incipient wetness technique. If the catalyst contains two metals in the hydrogenation component these may be added sequentially or simultaneously. The catalyst particles may be calcined between metal addition steps and again after the metals are added. The finished catalyst should have a surface area between about 300 and 550 m$^2$/g and an average bulk density (ABD) from about 0.9 to about 0.96 g/cc.

The hydrocracking catalyst can be employed in what are referred to in the art as one-stage and two-stage process flows, with or without prior hydrotreating. These terms are used as defined and illustrated in *Hydrocracking Science and Technology*, by Julius Scherzer and A. J. Gruia published in 1996 by Marcel Dekker, Inc., New York, ISBN 0-8247-9760-4, especially at pages 174-183 and FIGS. 10.2, 10.3 and 10.4. In a two-stage process the hydrocracking catalyst can be employed in either the first or second stage. The catalyst may be preceded by a hydrotreating catalyst in a separate reactor or may be loaded into the same reactor as a hydrotreating catalyst or a different hydrocracking catalyst (e.g., in a stacked bed arrangement). An upstream hydrotreating catalyst can be employed as feed pretreatment step or to hydrotreat recycled unconverted materials. The hydrotreating catalyst can be employed for the specific purpose of hydrotreating polynuclear aromatic (PNA) compounds to promote their conversion in subsequent hydrocracking catalyst bed(s). The hydrocracking catalyst can also be employed in combination with a second, different catalyst, such as a catalyst based upon Y zeolite or having primarily amorphous cracking components.

The hydrocracking catalyst can also contain a Y zeolite. The term "Y zeolite" as used herein is meant to encompass all crystalline zeolites having either the essential X-ray powder diffraction pattern set forth in U.S. Pat. No. 3,130,007 or a modified Y zeolite having an X-ray powder diffraction pattern similar to that described in U.S. Pat. No. 3,130,007 but with the d-spacings shifted somewhat due, as those skilled in the art will realize, to cation exchanges, calcinations, etc., which are generally necessary to convert the Y zeolite into a catalytically active and stable form. The processes described herein may utilize, in a hydrocracking catalyst, a Y zeolite having either or both of the two properties mentioned above, such Y zeolites being modified Y zeolites in comparison to the Y zeolite taught in U.S. Pat. No. 3,130,007. As used herein, unit cell size means the unit cell size as determined by X-ray powder diffraction. Preferably the amount of Y zeolite in the hydrocracking catalyst is less than the amount of beta zeolite, and preferably catalyst containing the Y zeolite is used in a stage operating at a relatively high per pass conversion to diesel boiling range and lighter hydrocarbons, such as above about 70% or above about 90%. A preferred Y zeolite is prepared by the four-step procedure taught in U.S. Pat. No. 5,350,501, which procedure is hereby incorporated by reference. The Y zeolite produced by the four-step procedure in U.S. Pat. No. 5,350,501 is a UHP-Y zeolite, an ultrahydrophobic Y zeolite as defined in U.S. Pat. No. 5,350,501. A preferred UHP-Y zeolite described in U.S. Pat. No. 5,350,501 is LZ-10 zeolite, which is a suitable Y zeolite for the hydrocracking catalyst. In addition, suitable Y zeolites for the hydrocracking catalyst include those prepared by the method described in U.S. Pat. No. 5,350,501, except with modifying the calcining conditions of the fourth treatment step in U.S. Pat. No. 5,350,501 so as to yield a unit cell size below 24.36 angstroms. The fourth step in U.S. Pat. No. 5,350,501 involves calcining the resulting zeolite from the third treatment step in the presence of sufficient water vapor (in an atmosphere consisting essentially of steam or consisting of steam) so as to yield a unit cell size below 24.40, and most preferably no more than 24.35 angstrom, and with a relatively low sorptive capacity for water vapor. In addition, suitable Y zeolites for the hydrocracking catalyst include the Y zeolites that result from acid washing the Y zeolites prepared by the method described in U.S. Pat. No. 5,350,501 or from acid washing the Y zeolites prepared by the method described in U.S. Pat. No. 5,350,501 with the modified fourth treatment step. Such acid washing removes non-framework aluminum from the Y zeolite and can be done by methods known to persons of ordinary skill in the art.

While it is known that steaming a zeolite such as beta zeolite results in changes to the actual crystalline structure, the abilities of present day analytical technology have not made it possible to accurately monitor and/or characterize these changes in terms of important structural details of the zeolite. The situation is more complicated in the case of beta zeolite compared to Y zeolite since there are nine different tetrahedral aluminum sites in beta zeolite but only one in Y zeolite. Instead, measurements of various physical properties of the zeolite such as surface area are used as indicators of changes that have occurred and the extent of the changes. For instance, it is believed that a reduction in zeolite adsorption capacity for hexafluoride ($SF_6$) after steaming results from a reduction in the crystallinity of the zeolite or in the size or accessibility of zeolite micropores. This measurement correlates with changes in the zeolite that may be undesirable, and therefore the $SF_6$ adsorption capacity in hydrocracking catalysts used in the processes disclosed herein is preferably relatively high. In one embodiment of the hydrocracking processes disclosed herein, the $SF_6$ adsorption capacity of the beta zeolite used in the hydrocracking catalyst, whether steam treated or not, is at least 28% (e.g., from about 30% to about 50%) by weight.

Although in one embodiment of the process disclosed herein, the beta zeolite has not been subjected to a steaming treatment, in other embodiments the beta zeolite may be subjected to mild steaming relative to conventional steaming methods practiced in the art. Under the proper conditions and time, steaming beta zeolite has been found to provide a catalyst that can be used in hydrocracking processes with the advantageous results described herein. There is, as previously mentioned, an apparent tradeoff between overall distillate yield, on the one hand, and LPG yield and activity, on the other hand, which result in a limit to the improvement obtainable by steaming.

Steaming of the beta zeolite can be performed successfully in different ways, with the method which is actually employed commercially often being greatly influenced and perhaps dictated by the type and capability of the available equipment. Steaming can be performed with the zeolite retained as a fixed mass or with the zeolite being conveyed by means of a belt or being agitated in a rotating kiln. The important factors are uniform treatment of all zeolite particles under appropriate conditions of time, temperature and steam concentration. For instance, the zeolite should not be placed such that there is a significant difference in the amount of steam contacting the surface and the interior of the zeolite mass. In one embodiment, the beta zeolite is steam treated in an atmosphere having live steam passing through the equipment providing low steam concentration. This may be described as being at a steam concentration of a positive amount less than 50 mol-%. Steam concentrations may range from 1 to 20 mol-% in one embodiment and from 5 to 10 mol-% in another embodiment, with small-scale laboratory operations extending toward higher concentrations. The steaming in one embodiment is performed for a time period of less than or equal to 2 hours, or in another embodiment for 1 to 2 hours, in either of these embodiments at a temperature of less than or equal to about 600° C. (1112° F.) at atmospheric pressure and a positive content of steam of less than or equal to 5 mol-%. The steaming in another embodiment is performed for a time period of less than or equal to 2 hours at a temperature of less than or equal to about 650° C. (1202° F.) at atmospheric pressure and a positive content of steam of less than or equal to 10 mol-%. The steam contents are based on the weight of vapors contacting the zeolite beta. Steaming at temperatures above 650° C. (1202° F.) appears to result in zeolite that is not useful in the process disclosed herein since the $SF_6$ adsorption capacity of the resulting zeolite beta is too low. Temperatures below 650° C. (1202° F.) can be used, with representative steaming temperatures from about 600° C. (1112° F.) to about 650° C. (1202° F.) in one embodiment and less than 600° C. (1112° F.) in another embodiment. For good results, a time period from about ½ to about 2 hours can be used in one embodiment and from about 1 to about 1½ hours in another embodiment. There is normally an interplay between time and temperature of steaming, with an increase in temperature reducing the required time. In a particular embodiment, the method of performing steaming on a commercial scale is by means of a rotary kiln having steam injected at a rate which maintains an atmosphere of about 10 mol-% steam.

The beta zeolite used in hydrocracking catalysts described herein is in one embodiment not treated with an acid solution to effect dealumination. In this regard it is noted that essentially all raw (as synthesized) zeolite is exposed to an acid to reduce the concentration of sodium which remains from synthesis. This step in the zeolite manufacturing procedure is not considered part of the treatment of manufactured zeolite as described herein. In one embodiment, during the treatment and catalyst manufacturing procedures, the zeolite is only exposed to an acid during incidental manufacturing activities such as peptization during forming or during metals impregnation. In one embodiment, the zeolite is not acid washed after the steaming procedure, for example to remove aluminum "debris" from the pores.

An exemplary lab scale steaming procedure is performed with the zeolite held in a quartz tube (e.g., 6.4 cm (2½ inch) diameter) in a clam shell furnace. The temperature of the furnace is slowly ramped up by a controller. After the temperature of the zeolite reaches 150° C. (302° F.) steam generated from deionized water held in a flask is allowed to enter the bottom of the quartz tube and pass upward. Other gas can be passed into the tube to achieve the desired steam content. The flask is refilled as needed. In an exemplary procedure the time between cutting in the steam and the zeolite reaching 600° C. (1112° F.) is about one hour. At the end of the set steam period the temperature in the furnace may be reduced by resetting the controller to 20° C. (68° F.). The furnace is allowed to cool to 400° C. (752° F.) (e.g., in about 2 hours), after which the flow of steam into the quartz tube is stopped. The sample is removed at 100° C. (212° F.) and placed in a lab oven held overnight at 110° C. (230° F.) with an air purge.

The beta zeolite used in hydrocracking catalysts as described herein may also be characterized in terms of $SF_6$ adsorption. This is a recognized technique for the characterization of microporous materials such as zeolites. It is similar to other adsorption capacity measurements, such as water capacity, in that it uses weight differences to measure the amount of $SF_6$ which is adsorbed by a sample which has been pretreated to be substantially free of the adsorbate. $SF_6$ is used in this test because the size and shape of this molecule hinders its entrance into pores having a diameter of less than about 6 Angstroms. It thus can be used in one measurement of available pore mouth and pore diameter shrinkage, which is in turn is a measurement of the effect of steaming on the zeolite. In a simplistic description of this method, the sample is preferably predried in a vacuum at 350° C. (662° F.) and weighed. It is then exposed to $SF_6$ for one hour while the sample is maintained at a temperature of 20° C. (68° F.). The $SF_6$ vapor pressure is maintained at that corresponding to liquid $SF_6$ at 400 Torr. The sample is again weighed to measure the amount of adsorbed $SF_6$. The sample may be suspended on a scale to facilitate the procedure.

In any mass production procedure involving techniques such as steaming and heating there is a possibility for individual particles to be subjected to differing levels of treatment. For instance, particles on the bottom of a pile moving along a belt may not be subjected to the same atmosphere or temperature as the particles which cover the top of the pile. This factor must be considered during manufacturing and also during analysis and testing of the finished product. It is, therefore, recommended that any test measure is performed on a number of randomly obtained individual catalyst pellets to avoid being misled by measurements on a non-representative sample. For instance, an adsorption capacity measurement made using several pellets reports the average adsorption of all the pellets and does not indicate whether any individual particle meets adsorption criteria. The average adsorption value could be within specification while the individual particles, in the case of large particle-to-particle variances, are not within the specification.

In the hydrocracking catalyst bed or zone, the heavy hydrocarbon feedstock is contacted with a hydrocracking catalyst as described above to provide the hydrocracker effluent. Normally, the heavy hydrocarbon feedstock is combined with a hydrogen-containing gas stream prior to contacting the hydrocracking catalyst. Most often, this hydrogen-containing gas stream is a combined recycle hydrogen gas stream, which is generally the combination of (i) a hydrogen-rich gas stream separated in a downstream gas/liquid separation (e.g., in a high pressure separator), and (ii) a relatively smaller amount of a fresh make-up hydrogen stream added to restore the amount of hydrogen consumed in the hydrocracking reactions and also lost from the process as dissolved hydrogen.

The inventive processes are therefore broadly directed to the hydrocracking of hydrocarbon streams normally used as hydrocracker feeds in refinery operations (e.g., gas oils such as straight run gas oil or VGO), in which the hydrocracker effluent is separated into one or more lower boiling fractions as products (e.g., naphtha and diesel) and a higher boiling fraction as an unconverted oil. The separations are generally accomplished using one or more flash and/or distillation operations, depending on the particular heavy hydrocarbon feedstock and desired product streams. In a representative embodiment, the unconverted oil is obtained as the bottoms fraction in a recovery stage involving flash separation of the hydrocracker effluent (optionally following the separation of a hydrogen-rich gas stream as described above), while the overhead fraction, containing converted (or cracked), lower molecular weight hydrocarbons is passed to downstream fractionation operations to recover the product streams, typically having a higher value than the unconverted oil. As described in the above-mentioned U.S. Pat. No. 6,432,297, the flash separation may be accompanied by stripping such as with a hydrogen-containing gas stream. The conditions used for separation of the unconverted oil will determine its composition and its initial boiling temperature.

The converted hydrocarbon fraction is therefore recovered as a lower boiling fraction (e.g., at least with respect to its distillation end point) relative to the hydrocracker effluent. This recovery may be carried out, for example, after separation of a hydrogen-rich gas stream as described above and possibly after the separation of other recycle gas components and/or after other stages of light ends or heavy ends removal. Distillation of the converted hydrocarbon fraction can therefore yield naphtha and diesel products. Depending on product needs, which govern the fractionation conditions, the distillation end point temperature of the naphtha product stream may vary. For example, a relatively light naphtha product stream may be separated from the converted hydrocarbon fraction, with this product having a distillation end point temperature of about 149° C. (300° F.) (e.g., from about 132° C. (270° F.) to about 160° C. (320° F.)). According to other embodiments, a relatively heavy naphtha product stream may be separated, having a distillation end point temperature of about 204° C. (400° F.) (e.g., from about 193° C. (380° F.) to about 216° C. (420° F.)). The naphtha itself may be fractionated into one or more naphtha fractions, for example light naphtha, gasoline, and heavy naphtha, with representative distillation end points being in the ranges from about 132° C. (270° F.) to about 160° C. (320° F.), from about 168° C. (335° F.) to about 191° C. (375° F.), and from about 193° C. (380° F.) to about 216° C. (420° F.), respectively. In any naphtha or naphtha fraction characterized as discussed above with respect to its distillation end point temperature, a representative "front end" or initial boiling point temperature is about 85° C. (185° F.) (e.g., from about 70° C. (158° F.) to about 100° C. (212° F.)). According to representative embodiments of the invention, the yield of naphtha (having a distillation initial boiling point and/or end point in any of the ranges described above, is generally at least about 15% by volume (e.g., from about 20% to about 50% by volume), and normally at least about 25% by volume (e.g., from about 30% to about 45% by volume) of the hydrocracker effluent.

Typically, it is desirable to separate, in a higher boiling fraction, hydrocarbons from the hydrocracker effluent that boil at temperatures above those representative of diesel boiling range hydrocarbons. The unconverted oil will therefore generally have an initial boiling point (or "front-end") temperature of at least about 288° C. (550° F.), typically at least about 316° C. (600° F.), and often at least about 343° C. (650° F.). As discussed above, in many cases this higher boiling fraction will represent a minor amount (e.g., less than about 45% by volume) of the hydrocracker effluent, due to the significant extent of cracking reactions occurring in the hydrocracking reactor or reaction zone to provide lower molecular weight products. The distillation end point of the unconverted oil is generally close to that of VGO, especially in cases in which VGO is used is used as a major component of, or as the entire, fresh feed component. Typically, therefore, the unconverted oil has a distillation end point temperature of at most about 593° C. (1100° F.) (e.g., in the range from about 510° C. (950° F.) to about 593° C. (1100° F.)), and often at most about 566° C. (1050° F.).

The unconverted oil is separated, as a higher boiling component (at least with respect to its initial boiling point) relative to the total hydrocracker effluent, from this effluent optionally following a separation of a hydrogen-rich gas stream (e.g., in a high pressure separator). The unconverted oil contains a substantial amount of hydrocarbons suitable for lube base stocks, and particularly saturated and isomerized (branched) hydrocarbons. The reductions in sulfur, nitrogen, and metal of the unconverted oil compared to both the fresh feed to the hydrocracker and the combined, heavy hydrocarbon feedstock, are also favorable in lube base stocks.

Therefore, while a portion of the unconverted oil is beneficially recycled to the hydrocracking reactor, a non-recycled portion may be used as a lube base stock, optionally following one or more additional treatment steps such as hydrofinishing to further saturate the unconverted oil and further reduce nitrogen and sulfur contaminant levels. According to some embodiments, the non-recycled portion is a minor portion (e.g., from about 5% to about 45% by weight) of the unconverted oil, whereas in other embodiments the non-recycled portion is a major portion (e.g., from at least about 50% to about 95% by weight) of the unconverted oil. Once-through operation (i.e., without any recycle of the unconverted oil) represents still another embodiment according to which the hydrocracking methods may be practiced. The non-recycled portion of the unconverted oil may therefore represent all or substantially all (e.g., greater than about 95%) of the unconverted oil recovered as a higher boiling fraction from the hydrocracker effluent.

Advantageously, the unconverted oil according to some embodiments is used as a lube base stock without a separate hydroisomerization step or dewaxing step, due to the substantial isomerization of the heavy hydrocarbon feedstock already obtained in conjunction with cracking, according to the methods described above. In particular, the unconverted oil recovered directly from the hydrocracking effluent may have a sufficiently low pour point to be used as a lube base stock, without being contacted with a noble metal (e.g., platinum or palladium) containing catalyst conventionally used for pour point reduction.

A hydrofinishing step, if used, involves contacting the non-recycled portion of the unconverted oil, as described above, with a hydrofinishing catalyst in a hydrofinishing reactor or reaction zone. In particular, at least a part, and normally all, of the non-recycled portion of the unconverted oil, optionally in combination with another hydrocarbon stream that may likewise benefit from hydrofinishing, is contacted, as a hydrofinishing reactor feed, with the hydrofinishing catalyst to provide the lube base stock. The lube base stock may therefore comprise at least part of the non-recycled portion of the unconverted oil, after having undergone hydrofinishing, for example, to reduce sulfur content. Hydrofinishing generally includes the introduction into the hydrofinishing reactor or reaction zone of a separate hydrogen-containing gas stream, which may comprise a hydrogen-rich gas stream or a combined recycle gas stream obtained from hydrocracking as described above.

Hydrofinishing is generally carried out in the presence of a hydrofinishing catalyst at an average bed temperature from about 288° C. (550° F.) to about 454° C. (850° F.), a hydrogen partial pressure from about 6.2 MPa (800 psig) to about 17.2 MPa (2500 psig), and a liquid hourly space velocity (LHSV) from about 0.5 $hr^{-1}$ to about 3 $hr^{-1}$. Suitable hydrofinishing catalysts normally comprise a metal selected from the group consisting of platinum, palladium, nickel, cobalt, tungsten, molybdenum, and mixtures thereof, on a refractory inorganic oxide support. The same or a different hydrofinishing catalyst may be used, relative to the hydrocracking catalyst. Hydrofinishing of at least part of the non-recycled portion of the unconverted oil obtained from hydrocracking may further improve various properties of the lube base stock by, for example, increasing viscosity index, oxidation resistance, thermal stability, and/or low temperature fluidity, as well as reducing volatility and toxicity.

The lube base stocks prepared according to methods described above, comprising hydrocracking and optionally hydrofinishing, will preferably meet the standards designated by the American Petroleum Institute (API) for Group II or Group III lubricant base oils. Group II and Group III specifications include at least 90% by weight of saturated hydrocarbons and at most about 300 ppm by weight of total sulfur. The viscosity index (VI) specifications for Group II and Group III are (i) in the range from 80 to less than 120 and (ii) at least 120, respectively. A high VI is important in terms of resisting "thinning out" of the lubricant at higher engine temperatures. The lube base stocks will generally be clear and colorless.

Aspects of the invention are therefore associated with the hydrocracking of heavy hydrocarbon feedstocks while simultaneously hydroisomerizing these feedstocks. The catalyst used to carry out the combined reactions may be in a single reactor. In some cases, it may be desired to use different types of catalysts, in terms of their composition, in different catalyst beds within the reactor. Different catalyst types may also be mixed to provide, for example, a homogeneous mixed catalyst bed. According to other embodiments, two or more separate reactors may be employed to perform the hydrocracking and hydroisomerization reactions as described above, depending on the need to carry out different reactions or different stages of these reactions under separate operating conditions (e.g., total pressure or hydrogen partial pressure) and/or the need to add or remove streams (e.g., hydrogen or hydrocarbons) between the stages or reactors.

As discussed above, particular aspects of the invention are associated with processes in which a conventional, separate hydroisomerization of a recovered, relatively high boiling fraction of the hydrocracker effluent (e.g., a non-recycled portion of the unconverted oil, as described above) is avoided. According to specific embodiments, therefore, the unconverted oil is not subjected to either catalytic hydroisomerization or catalytic dewaxing to reduce its pour point. Alternatively, according to other embodiments, the unconverted oil is not contacted with a catalyst comprising an expensive noble metal such as platinum or palladium to reduce its pour point. In still further embodiments in which hydrocracking is combined with hydrofinishing as described above, the hydrofinishing reactor feed has substantially the same pour point as the non-recycled portion of the unconverted oil separated from the hydrocracker effluent. For example, the pour points may be identical or may differ by a maximum of about 5° C. (9° F.), indicating that an intermediate stage (e.g., hydroisomerization or dewaxing) to substantially reduce the pour point of the hydrofinishing feed is avoided.

A simplified, representative process flowscheme illustrating a particular embodiment for carrying out the methods described above is depicted in FIG. 1. Details including pumps, instrumentation, heat exchange and heat-recovery circuits, and other items not essential to the understanding of the invention are not shown. FIG. 1 is to be understood to present an illustration of the invention and/or principles involved. As is readily apparent to one of skill in the art having knowledge of the present disclosure, methods according to various other embodiments of the invention will have configurations, components, and operating parameters determined, in part, by the specific feedstocks, products, and product quality specifications.

According to the embodiment illustrated in FIG. 1, a heavy hydrocarbon feedstock 1 comprises a mixture of (i) a recycled portion 11 of an unconverted oil 16 and (ii) VGO 12 as a fresh feed component. Heavy hydrocarbon feedstock 1 is added to a combined recycle gas stream 2 that is a mixture of a hydrogen-rich gas stream 5 recovered from a high pressure separator 30 and fresh make-up hydrogen stream 4. As shown, both the recovered, hydrogen-rich gas stream 5 and fresh make-up hydrogen stream 4 are fed to the suction or inlet (or alternatively fed to the discharge or outlet) of recycle compressor 40. The combined feed stream 17 is then contacted with hydrocracking catalyst in hydrocracking zone 20. As noted above, the conditions and catalyst in hydrocracking zone 20 are such that conversion to lower boiling point hydrocarbons (e.g., boiling in the diesel boiling range and below) in the hydrocracker effluent 3 is significant. Additionally, the extent of hydroisomerization of hydrocracker effluent 3 is sufficient to reduce the pour point of higher boiling fraction or unconverted oil 16, as also noted above.

A portion of the hydrocracker effluent 3, namely liquid portion 6 (or degassed portion), after separation of hydrogen-rich gas stream 5 in high pressure separator 30, is sent to a recovery stage 50 (e.g., a second flash separator or a distillation column) to obtain, as a liquid bottoms product, unconverted oil 16 and, as a vapor overhead product, converted hydrocarbon fraction 7 containing lower boiling, higher-value hydrocracked products which may be separated into product streams such as light naphtha 8, gasoline 9, and diesel fuel 10 by fractionation in product fractionator 60. Prior to this separation of product streams, converted hydrocarbon fraction 7 from recovery stage 50 may be subjected to one or more additional separations, for example in a low pressure separator (not shown) which removes additional amounts of dissolved hydrogen as well as light byproduct hydrocarbons, liquefied petroleum gas, and other light gases such as hydrogen sulfide. One or several distillation columns may be used to recover naphtha, diesel fuel, and other fuel components, depending on the heavy hydrocarbon feedstock processed and desired product slate. In some cases, it may be desired to recover a multitude of fuel components using fractionation, for example, the total yield of naphtha having a 204° C. (400° F.) end point may be used for gasoline blending or otherwise fractionated into light naphtha, gasoline, and heavy naphtha.

High pressure separator 30 is generally operated at substantially the same pressure as in hydrocracking zone 20 and at a temperature from about 38° C. (100° F.) to about 71° C. (160° F.). Hydrogen-rich gas stream 5 normally provides the majority of the total hydrogen in combined recycle gas stream 2, with the hydrogen consumed in hydrocracking zone 20 and lost through dissolution being replaced by fresh make-up hydrogen stream 4. In some cases, hydrocracker effluent 3 is contacted with an aqueous stream (not shown) to dissolve ammonium salts (e.g., ammonium chloride) formed in hydrocracking zone 20 that can condense as solid byproduct on cooler surfaces. This aqueous stream is then removed from high pressure separator 30 as a separate aqueous effluent stream.

Unconverted oil 16 is partitioned into recycled portion 11, which is recycled to hydrocracking reactor 20 and non-recycled portion 13, which may be used as a lube base stock. In an alternative embodiment, representing a once-through operating mode, unconverted oil 16 is not partitioned and all of unconverted oil 16 is further processed as discussed below with respect to non-recycled portion 13. As shown in FIG. 1, non-recycled portion 13 is contacted with a second hydrogen-containing gas stream 14 (which may comprise part of hydrogen-rich gas stream 5, make-up hydrogen stream 4, and/or combined recycle gas stream 2) prior to introduction of the combined hydrofinishing feed 18 into hydrofinishing reactor or reaction zone 70. Hydrofinishing reduces the content of unsaturated hydrocarbons and otherwise refines the non-recycled portion 13 as discussed above, in order to provide a hydrofinished product 15, particularly useful as a lube base stock.

Overall, aspects of the invention are directed to the use of hydrocracking catalysts and operating conditions to convert a heavy hydrocarbon feedstock to higher value products and hydroisomerize a heavy boiling fraction that is recovered as a lube base stock, optionally following a hydrofinishing step. Those having skill in the art will recognize the advantages of the methods described herein in terms of the ability to eliminate a conventional process step, namely the separate hydroisomerization of an unconverted oil, and associated catalyst and equipment, thereby realizing a substantial cost savings. Processes described herein may therefore consist of or consist essentially of hydrocracking and optionally hydrofinishing steps to yield lube base stocks, without any additional material process steps including hydroisomerization or dewaxing.

In view of the present disclosure, it will be seen that several other advantages may be achieved and other advantageous results may be obtained. The applicability of the methods disclosed herein to any of a number of hydrocracking processes, and especially those involving the production of lube base stocks, will become apparent in view of the present disclosure. Those having skill in the art, with the knowledge gained from the present disclosure, will recognize that various changes could be made in the above processes without departing from the scope of the present disclosure. Mechanisms used to explain theoretical or observed phenomena or results, shall be interpreted as illustrative only and not limiting in any way the scope of the appended claims.

The following examples are set forth as representative of the present invention. These examples are not to be construed as limiting the scope of the invention as these and other equivalent embodiments will be apparent in view of the present disclosure and appended claims.

EXAMPLE 1

Vacuum gas oil was subjected to hydrocracking in the presence of (i) a conventional hydrocracking catalyst (Catalyst A) comprising nickel and tungsten on bound zeolite LZ-15 and (ii) a catalyst (Catalyst B) comprising these metals but supported on bound beta zeolite. For each of the two catalysts tested, the hydrocracking conditions were varied to achieve 55%, 70%, and 85% once-through conversion (by volume) of the VGO to diesel boiling range hydrocarbons and lighter materials. The unconverted oil having a 382° C. (720° F.) front end cut point was then analyzed in each case and the results of this analysis are shown in Tables 1-3 below for the different once-through conversion levels:

TABLE 1

Once-Through 55% Gross Liquid Volume Conversions
Product Properties for >720° F. Cut

| | CATALYST | | |
|---|---|---|---|
| | A | B | Delta |
| Net Weight Conversion % | 52.5 | 53.2 | |
| Gravity, °API | 35.5 | 34.7 | |
| Hydrogen, wt-% | 14.1 | 14.0 | |
| Aromatics, wt-% | 6.4 | 4.4 | |
| Sulfur, wt-ppm | <10 | 10.0 | |
| Viscosity @ 38° C., cSt | N/A | 30.9 | |
| Viscosity @ 50° C., cSt | 17.3 | 19.4 | |
| Viscosity @ 60° C., cSt | 12.8 | 13.4 | |
| Viscosity @ 99° C., cSt | 5.2 | 5.4 | |
| Flash Point, °F. | 429.8 | 404.6 | |
| Pour Point, °F. | 102.2 | 48.2 | −54.0 |
| Microcarbon Residue, wt-% | 0.2 | 0.0 | |
| Nickel, wt-ppm by ICP | 0.0 | <0.01 | |
| Vanadium, wt-ppm by ICP | <0.01 | <0.01 | |
| Initial Boiling Point, °F. | 627 | 604 | |
| 10%, °F. | 745 | 739 | |
| 50%, °F. | 827 | 820 | |
| 90%, °F. | 931 | 925 | |
| EP, °F. | 1039 | 1033 | |
| Viscosity Index (50-99° C.) | 138.8 | 122.7 | |
| Bureau of Mines Correlation Index | 12.3 | 14.6 | |

TABLE 2

Once-Through 70% Gross Liquid Volume Conversions
Product Properties for >720° F. Cut

| | CATALYST | | |
|---|---|---|---|
| | A | B | Delta |
| Net Weight Conversion % | 67.6 | 67.6 | |
| Gravity, °API | 37.1 | 35.9 | |
| Hydrogen, wt-% | 14.5 | 14.0 | |
| Aromatics, wt-% | 3.3 | 4.3 | |
| Sulfur, wt-ppm | 7.0 | 11.0 | |
| Viscosity @ 38° C., cSt | 23.7 | 28.5 | |
| Viscosity @ 50° C., cSt | 15.4 | 18.0 | |
| Viscosity @ 60° C., cSt | 11.5 | 12.4 | |
| Viscosity @ 99° C., cSt | 4.8 | 5.1 | |
| Flash Point, °F. | 408.2 | 426.2 | |
| Pour Point, °F. | 96.8 | 26.6 | −70.2 |
| Microcarbon Residue, wt-% | 0.0 | 0.0 | |
| Nickel, wt-ppm by ICP | <0.01 | <0.01 | |
| Vanadium, wt-ppm by ICP | <0.01 | <0.01 | |
| Initial Boiling Point, °F. | 580 | 612 | |
| 10%, °F. | 742 | 738 | |
| 50%, °F. | 824 | 817 | |
| 90%, °F. | 923 | 921 | |
| EP, °F. | 1046 | 1030 | |
| Viscosity Index (50-99° C.) | 143.2 | 120.4 | |
| Viscosity Index (38-99° C.) | 136.2 | 116.8 | |
| Bureau of Mines Correlation Index | 8.7 | 11.8 | |

TABLE 3

Once-Through 85% Gross Liquid Volume Conversions
Product Properties for >720° F. Cut

| | CATALYST | | |
|---|---|---|---|
| | A | B | Delta |
| Net Weight Conversion % | 82.1 | 83.0 | |
| Gravity, °API | 38.8 | 36.7 | |

TABLE 3-continued

Once-Through 85% Gross Liquid Volume Conversions
Product Properties for >720° F. Cut

| | CATALYST | | |
|---|---|---|---|
| | A | B | Delta |
| Hydrogen, wt-% | 14.3 | 13.9 | |
| Aromatics, wt-% | 2.3 | 3.9 | |
| Sulfur, wt-ppm | <5 | 10.0 | |
| Viscosity @ 38° C., cSt | 19.1 | 25.5 | |
| Viscosity @ 50° C., cSt | 12.9 | 16.2 | |
| Viscosity @ 60° C., cSt | 9.7 | 11.3 | |
| Viscosity @ 99° C., cSt | 4.2 | 4.7 | |
| Flash Point, ° F. | 408.2 | 415.0 | |
| Pour Point, ° F. | 86.0 | 26.6 | −59.4 |
| Microcarbon Residue, wt-% | 0.3 | 0.0 | |
| Nickel, wt-ppm by ICP | <0.01 | <0.01 | |
| Vanadium, wt-ppm by ICP | <0.01 | <0.01 | |
| Initial Boiling Point, ° F. | 629 | 613 | |
| 10%, ° F. | 738 | 737 | |
| 50%, ° F. | 800 | 803 | |
| 90%, ° F. | 887 | 901 | |
| EP, ° F. | 996 | 1014 | |
| Viscosity Index (50-99° C.) | 137.9 | 115.2 | |
| Viscosity Index (38-99° C.) | 136.7 | 111.1 | |

EXAMPLE 2

Vacuum gas oil was subjected to hydrocracking in the presence of (i) Catalyst A as described in Example 1 and (ii) Catalyst B as described in Example 1, and (iii) a stacked catalyst bed comprising Catalyst B as described in Example 1 and Catalyst C, comprising nickel and tungsten in different amounts relative to Catalyst B, but also supported on bound beta zeolite. The stacked hydrocracking catalyst bed arrangement utilized 70%/30% by weight of Catalyst B/Catalyst C. For the catalyst beds tested, the hydrocracking conditions achieved 70% once-through conversion (by volume) of the VGO to diesel boiling range hydrocarbons and lighter materials. The unconverted oil having a 382° C. (720° F.) front end cut point was then analyzed in each case and the results of this analysis are shown in Table 4 below:

TABLE 4

Once-Through 70% Gross Liquid Volume Conversions
Product Properties for >720° F. Cut

| | CATALYST | | |
|---|---|---|---|
| | A | B | B/C (70/30) |
| Net Weight Conversion % | 67.6 | 67.6 | 68.1 |
| Gravity, °API | 37.1 | 35.9 | 36.9 |
| Hydrogen, wt-% | 14.5 | 14.0 | 14.2 |
| Aromatics, wt-% | 3.3 | 4.3 | 3.7 |
| Sulfur, wt-ppm | 7.0 | 11.0 | 21.0 |
| Viscosity @ 38° C., cSt | 23.7 | 28.5 | 24.9 |
| Viscosity @ 50° C., cSt | 15.4 | 18.0 | 16.2 |
| Viscosity @ 60° C., cSt | 11.5 | 12.4 | 11.6 |
| Viscosity @ 99° C., cSt | 4.8 | 5.1 | 4.8 |
| Flash Point, ° F. | 408.2 | 426.2 | 437.0 |
| Pour Point, ° F. | 96.8 | 26.6 | 27.0 |
| Microcarbon Residue, wt-% | 0.0 | 0.0 | 0.0 |
| Nickel, wt-ppm by ICP | <0.01 | <0.01 | 0.0 |
| Vanadium, wt-ppm by ICP | <0.01 | <0.01 | <.01 |
| Initial Boiling Point, ° F. | 580 | 612 | 706 |
| 10%, ° F. | 742 | 738 | 742 |
| 50%, ° F. | 824 | 817 | 815 |
| 90%, ° F. | 923 | 921 | 918 |
| EP, ° F. | 1046 | 1030 | 1028 |
| Viscosity Index | 135 | 117.3 | 128.4 |

As indicated in the results obtained in Examples 1 and 2 above, each of the hydrocracking catalysts provided, at comparable conversion levels, similar densities (in degrees API); contents of hydrogen, aromatics, sulfur and trace metals (nickel and vanadium); distillation data; flash points; and other properties. However, the unconverted oil recovered from the effluent of the hydrocracking reactor containing Catalyst B in Examples 1 and 2, or a stacked bed arrangement of Catalyst B and Catalyst C in Example 2, had a significantly lower pour point, in each case being below 10° C. (50° F.), whereas the conventional catalyst, Catalyst A, resulted in the unconverted oil having a pour point in all cases of above 29° C. (85° F.). The significant reduction in pour point of the unconverted oil resulting from the use of Catalyst B (alone or in a stacked arrangement with Catalyst C), having a support comprising beta zeolite, in the hydrocracking zone has important implications for the use of this unconverted oil as a lube base stock. In particular, the low pour point is indicative of a conventionally hydroisomerized or dewaxed (e.g., in a separate reaction step) product that may be used as a lube base stock with little or no additional hydroisomerization (e.g., in a separate reactor downstream of hydrocracking and possibly in the presence of a platinum or palladium metal catalyst).

Moreover, the results obtained for the stacked bed of Catalyst B/C demonstrates that catalysts as described herein may be used in separate beds or zones to further improve or optimize properties of the unconverted oil, as exemplified by the higher viscosity index obtained using the stacked catalyst bed arrangement, compared to Catalyst B alone. Those having skill in the art will also appreciate that conditions used in the hydrofinishing of unconverted oil, having the properties shown in these examples and described elsewhere herein, may be varied to achieve desired specifications including saturated hydrocarbon content, sulfur level, and viscosity index.

The invention claimed is:

1. A method for preparing a lube base stock, the method comprising
    (a) hydrocracking, in a hydrocracking zone containing a hydrocracking catalyst comprising a beta zeolite with a silica:alumina molar ratio of less than 30:1, a heavy hydrocarbon feedstock to obtain a hydrocracker effluent comprising at least about 40% by weight of hydrocarbons boiling at a temperature of less than 382° C. (720° F.), and
    (b) separating, as a higher boiling fraction from the hydrocracker effluent, an unconverted oil bottoms product having a pour point of at most about 18° C. (65° F.).

2. The method of claim 1, wherein the unconverted oil is separated by flash separation or distillation of the hydrocracker effluent to obtain the bottoms product.

3. The method of claim 1, wherein the unconverted oil has an initial boiling point temperature of at least about 288° C. (550° F.).

4. The method of claim 1, wherein the lube base stock comprises a non-recycled portion of the unconverted oil separated in step (b).

5. The method of claim 4, wherein the lube base stock has a sulfur content of at most about 300 ppm by weight.

6. The method of claim 4, wherein the lube base stock has a viscosity index of at least about 100.

7. The method of claim 4, wherein the non-recycled portion of the unconverted oil is subjected to hydrofinishing, whereby the lube base stock comprises at least about 90% by weight of saturated hydrocarbons.

8. The method of claim 7, wherein lube base stock meets API Group II or Group III specifications and is obtained without subjecting the unconverted oil to a catalytic hydroisomerization or a catalytic dewaxing step.

9. The method of claim 8, wherein, prior to hydrofinishing, the unconverted oil is not contacted with a catalyst comprising a noble metal.

10. The method of claim 7, wherein the hydrofinishing is carried out in the presence of a hydrofinishing catalyst at an average bed temperature from about 288° C. (550° F.) to about 454° C. (850° F.), a hydrogen partial pressure from about 17.2 MPa (2500 psig) to about 8.3 MPa (1400 psig), and a liquid hourly space velocity (LHSV) from about 0.5 hr$^{-1}$ to about 3 hr$^{-1}$, wherein the hydrofinishing catalyst comprises a metal selected from the group consisting of platinum, palladium, nickel, cobalt, tungsten, molybdenum, and mixtures thereof, on a refractory inorganic oxide support.

11. The method of claim 1, wherein the lube base stock comprises all or substantially all of the unconverted oil separated in step (b).

12. The method of claim 1, wherein the heavy hydrocarbon feedstock comprises vacuum gas oil.

13. The method of claim 1, wherein the heavy hydrocarbon feedstock comprises a recycled portion of the unconverted oil separated in step (b).

14. The method of claim 1, wherein the heavy hydrocarbon feedstock has an initial boiling point of greater than about 343° C. (650° F.).

15. The method of claim 1, wherein the unconverted oil has a distillation end point temperature of at most about 593° C. (1100° F.).

16. The method of claim 1, wherein the hydrocracking is carried out in the presence of a hydrocracking catalyst and hydrogen, at an average hydrocracking catalyst bed temperature from about 316° C. (600° F.) to about 454° C. (850° F.), a hydrogen partial pressure from about 8.3 MPa (1200 psig) to about 17.2 MPa (2500 psig), an LHSV from about 0.5 to about 3 hr$^{-1}$, and a hydrogen circulation rate from about 4000 standard cubic feet per barrel (692 normal m$^3$/m$^3$) to about 15,000 standard cubic feet per barrel (2530 normal m$^3$/m$^3$).

17. The method of claim 16, wherein the hydrocracking catalyst comprises a metal selected from the group consisting of nickel, cobalt, tungsten, molybdenum, and mixtures thereof, deposited on said beta zeolite.

18. The method of claim 17, wherein the zeolite is a beta zeolite with a silica:alumina molar ratio of more than 9:1 and less than 30:1.

19. A process for preparing a lube base stock, the process comprising
(a) hydrocracking, in a hydrocracking zone containing a hydrocracking catalyst comprising a beta zeolite with a silica:alumina molar ratio of less than 30:1, a heavy hydrocarbon feedstock comprising vacuum gas oil and a recycled portion of an unconverted oil to obtain a hydrocracker effluent comprising at least about 55% by weight of hydrocarbons boiling at a temperature of less than 382° C. (720° F.);
(b) passing at least a portion of the hydrocracker effluent to a flash separator to obtain, (i) as a liquid bottoms product, an unconverted oil having a pour point of at most about 18° C. (65° F.), and (ii) a vapor overhead product;
(c) recycling the recycled portion of the unconverted oil to the hydrocracking zone; and
(d) hydrofinishing a non-recycled portion of the unconverted oil to reduce the content of unsaturated hydrocarbons in the non-recycled portion and provide the lube base stock;

wherein the hydrocracking catalyst comprises a metal selected from the group consisting of nickel, cobalt, tungsten, molybdenum, and mixtures thereof, deposited on said beta zeolite.

20. The process of claim 19, wherein the unconverted oil obtained in step (b) is not subjected to hydroisomerization or dewaxing.

* * * * *